(12) United States Patent
Wang et al.

(10) Patent No.: US 9,898,177 B2
(45) Date of Patent: Feb. 20, 2018

(54) DISPLAY PROCESSING METHOD AND PORTABLE MOBILE TERMINAL

(75) Inventors: Geng Wang, Beijing (CN); Ran Sun, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 1211 days.

(21) Appl. No.: 13/824,832

(22) PCT Filed: Sep. 21, 2011

(86) PCT No.: PCT/CN2011/079941
§ 371 (c)(1),
(2), (4) Date: Mar. 18, 2013

(87) PCT Pub. No.: WO2012/041175
PCT Pub. Date: Apr. 5, 2012

(65) Prior Publication Data
US 2016/0188178 A1    Jun. 30, 2016

(30) Foreign Application Priority Data
Sep. 27, 2010 (CN) .......................... 2010 1 0294512

(51) Int. Cl.
*G06F 3/00* (2006.01)
*G06F 3/0484* (2013.01)
(Continued)

(52) U.S. Cl.
CPC ........ *G06F 3/04845* (2013.01); *G06F 3/0482* (2013.01); *G06F 3/04842* (2013.01); *G06F 3/04883* (2013.01); *G06F 2203/04104* (2013.01)

(58) Field of Classification Search
CPC ............. G06F 3/04845; G06F 3/04883; G06F 3/0482; G06F 3/04842; G06F 3/0416;
(Continued)

(56) References Cited

U.S. PATENT DOCUMENTS 5,757,358 A    5/1998  Osga
6,040,824 A    3/2000  Maekawa et al.
(Continued)

FOREIGN PATENT DOCUMENTS

CA    2640785    4/2009
CN    1331815    1/2002
(Continued)

OTHER PUBLICATIONS

Michael Bohan and Deborah Scarlett, "Can Expanding Targets Make Object Selection Easier for Older Adults?", published on Feb. 11, 2004 to http://usabilitynews.org/can-expanding-targets-make-object-selection-easier-for-older-adults, retrieved Apr. 17, 2017.*
(Continued)

*Primary Examiner* — Shourjo Dasgupta
(74) *Attorney, Agent, or Firm* — Brinks Gilson & Lione; G. Peter Nichols

(57) ABSTRACT

A display processing method that is applied in a portable mobile terminal, to display multiple objects on a touch screen of the portable mobile terminal. The method includes obtaining a touch point that is a point created when an operating object contacts/almost touches the touch screen; determining a preset area with the touch point being the center; determining a first object and a second object, among multiple objects, each intersecting with the preset area on at least one point; determining a first information of the movement of the first object, the first information indicating moving the first object from a first position to a second position, the first position being the original position of the
(Continued)

touch point first object displayed on the touch screen; and moving the first object from the first position to the second position according to the first information.

10 Claims, 15 Drawing Sheets

(51) Int. Cl.
*G06F 3/0482* (2013.01)
*G06F 3/0488* (2013.01)

(58) Field of Classification Search
CPC ...... G06F 3/0418; G06F 3/041; G06F 3/0412; G06F 3/04817; G06F 2203/04108; G06F 2203/04101; G06F 2203/04104; G06T 7/0085; G06T 7/004
See application file for complete search history.

(56) References Cited

U.S. PATENT DOCUMENTS

| | | | |
|---|---|---|---|
| 6,259,436 B1 | 7/2001 | Moon et al. | |
| 6,920,619 B1* | 7/2005 | Milekic | G06F 3/0488 715/702 |
| 6,968,511 B1* | 11/2005 | Robertson | G06F 3/048 715/205 |
| 7,737,958 B2 | 6/2010 | Jeon et al. | |
| 2003/0007017 A1* | 1/2003 | Laffey | G06F 3/04842 715/862 |
| 2004/0243306 A1* | 12/2004 | Han | G01C 21/3682 701/438 |
| 2007/0040813 A1* | 2/2007 | Kushler | G06F 3/0237 345/173 |
| 2007/0250786 A1 | 10/2007 | Jeon et al. | |
| 2008/0172633 A1 | 7/2008 | Jeon et al. | |
| 2009/0315848 A1* | 12/2009 | Ku | G06F 3/0416 345/173 |
| 2011/0181522 A1* | 7/2011 | Rendahl | G06F 3/04886 345/173 |
| 2012/0188191 A1* | 7/2012 | Chen | G06F 3/04883 345/173 |

FOREIGN PATENT DOCUMENTS

| | | |
|---|---|---|
| CN | 101105733 | 1/2008 |
| CN | 101419526 | 4/2009 |
| CN | 101770331 | 7/2010 |
| TW | 200745921 | 12/2007 |

OTHER PUBLICATIONS

"Using Touch-Screen Equipped PCs With POV", published on Oct. 19, 2006 to http://support.automationdirect.com/docs/an-pov-004.pdf, retrieved Apr. 17, 2017.*
Third Office Action dated Jan. 24, 2014 in corresponding Chinese priority application 201010294512.5 (6 pages including English translation).
PCT/CN2011/079941 International Search Report dated Dec. 29, 2011 (4 pages).
First Office Action dated Oct. 17, 2012 in corresponding Chinese priority application 201010294512.5 (16 pages including English translation).
PCT/CN2011/079941 International Preliminary Report on Patentability dated Apr. 2, 2013 (11 pages).
Second Office Action dated Jul. 9, 2013 in corresponding Chinese priority application 201010294512.5 (15 pages including English translation).

* cited by examiner

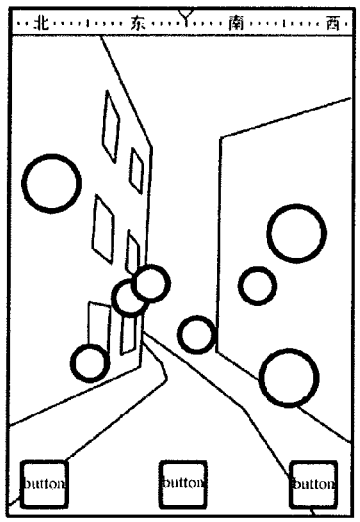 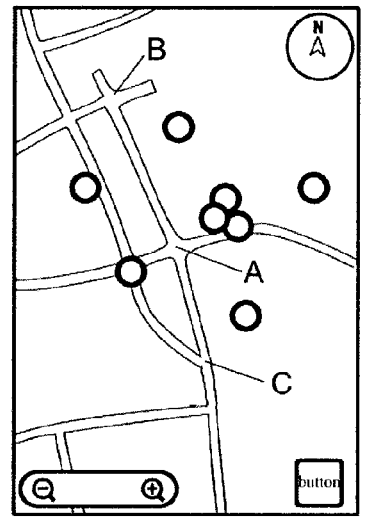
Fig.2a  Fig.2b
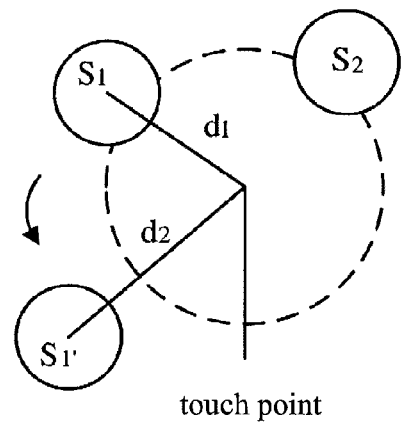
Fig.3 touch point touch point

DISPLAY PROCESSING METHOD AND PORTABLE MOBILE TERMINAL

This application claims priority to International Application No. PCT/CN2011/079941 filed Sep. 21, 2011; and to Chinese Patent Appln. CN201010294512.5 filed on Sep. 27, 2010 the entire contents of each are incorporated herein by reference.

The present invention relates to a display processing method and a portable mobile terminal, and more particularly to a display processing method and a portable mobile terminal for processing the overlapping touch points on the touch screen.

BACKGROUND

Nowadays, more and more portable mobile terminals use touch screens as display and input devices. Generally, the size of the touch screen of the portable mobile terminal is limited, whereas, compared with the screen, the operating finger is not small. When a finger is used for input, it is difficult to accurately select from the concentrated objects. Thus, a touch fault is caused and poor usage experience is brought to the user.

SUMMARY

Therefore, the present invention is provided for the above-described problems and needs in the prior art.

The object of the present invention is to provide a display processing method and a portable mobile terminal. Compared with the defects in the prior art, it can enable the user to effectively select from the overlapping or adjacent objects on a touch screen with a limited size.

The object of the present invention is to provide a display processing method and a portable mobile terminal, which can enable the user to easily select the overlapping objects on the touch screen by moving the overlapping objects on the touch screen to make them not separate or moving the adjacent objects far away from each other.

According to one aspect of the present invention, a display processing method is provided. The display processing method is applied in a portable mobile terminal with a touch screen, and multiple objects are displayed on the touch screen of the portable mobile terminal. The method comprises: obtaining a touch point, the touch point being a point created when an operating body contacts/approaches the touch screen; determining a predetermined area with the touch point being the center; determining a first object intersecting the predetermined area on at least one point and a second object intersecting the predetermined area on at least one point among multiple objects; determining first information of the movement of the first object, the first information indicating moving the first object from a first position to a second position, the first position being the original position of the first object displayed on the touch screen; and moving the first object from the first position to the second position according to the first information, wherein, the distance from the first position to the center is a first distance, the distance from the second position to the center is a second distance, and the first distance is shorter than the second distance.

In the above-described display processing method, the step of determining first information of the movement of the first object comprises: determining an edge extension area of the first object, wherein, the edge extension area of the first object is the area covered by the edge of the first object after it extends outwards for a predetermined distance of T; determining an edge extension area of the second object, wherein, the edge extension area of the second object is the area covered by the edge of the second object after it extends outwards for the predetermined distance of T; determining the first information of the first object according to an algorithm by which the edge extension areas of the objects do not intersect one another; wherein, when the first object is in the second position according to the first information, the edge extension area of the first object does not intersect the edge extension area of the second object.

The above-described display processing method further comprises: determining second information of the movement of the second object, the second information indicating moving the second object from a third position to a fourth position, the third position being the original position of the second object displayed on the touch screen; and moving the second object from the third position to the fourth position according to the second information, wherein, the distance from the third position to the center is a third distance, the distance from the fourth position to the center is a fourth distance, and the third distance is shorter than the fourth distance.

In the above-described display processing method, the step of determining second information of the movement of the second object further comprises: determining an edge extension area of the first object, wherein, the edge extension area of the first object is the area covered by the edge of the first object after it extends outwards for a predetermined distance of T; determining an edge extension area of the second object, wherein, the edge extension area of the second object is the area covered by the edge of the second object after it extends outwards for the predetermined distance of T; determining the second information of the second object according to an algorithm by which the edge extension areas of the objects do not intersect one another, wherein, when the first object is in the second position according to the first information and the second object is in the fourth position according to the second information, the edge extension area of the first object does not intersect the edge extension area of the second object.

The above-described display processing method, before the step of determining the information of the first object according to the algorithm by which the edge extension areas of the objects do not intersect one another, further comprising: judging whether there is a third object outside the predetermined area and producing a judgment information; and when the judgment information indicates that there is a third object outside the predetermined area, determining an edge extension area of the third object, wherein, the edge extension area of the third object is the area covered by the edge of the third object after it extends outwards for the predetermined distance of T.

In the above-described display processing method, the step of determining the first information of the first object according to the algorithm by which the edge extension areas of the objects do not intersect one another further comprises: when the first object is in the second position according to the first information, the edge extension area of the first object does not intersect the edge extension area of the second object, at the same time, both the edge extension area of the first object and the edge extension area of the second object do not intersect the edge extension area of the third object.

In the above-described display processing method, the predetermined area is a circle, the center of which is the touch point and the radius of which is r, wherein, the predetermined distance T is greater than or equal to r.

In the above-described display processing method, the predetermined area is a square, the center of which is the touch point and the distance from the center to each of the four sides of the square is R, wherein, the predetermined distance T is greater than equal to $\sqrt{2}R$.

Before the step of determining first information of the movement of the first object, the above-described display processing method further comprising: identifying the first object and the second object as available objects.

According to another aspect of the present invention, a portable mobile terminal is provided which has a touch screen and displays multiple objects on the touch screen. It comprises: a touch point obtaining unit, for obtaining a touch point, the touch point being a point created when an operating body contacts/approaches the touch screen; a predetermined area determining unit, connected to the touch point obtaining unit, for determining a predetermined area with the touch point being the center; an intersecting object determining unit, connected to the predetermined area determining unit, for determining a first object intersecting the predetermined area on at least one point and a second object intersecting the predetermined area on at least one point among multiple objects; a first information determining unit, connected to the intersecting object determining unit, for determining first information of the movement of the first object, the first information indicating moving the first object from a first position to a second position, the first position being the original position of the first object displayed on the touch screen; and a first object moving unit, connected to the first information determining unit, for moving the first object from the first position to the second position according to the first information, wherein the distance from the first position to the center is a first distance, the distance from the second position to the center is a second distance, and the first distance is shorter than the second distance.

In the above-described portable mobile terminal, the first information determining unit further comprises: a first edge extension area determining unit, connected to the intersecting object determining unit, for determining an edge extension area of the first object, wherein, the edge extension area of the first object is the area covered by the edge of the first object after it extends outwards for a predetermined distance of T; a second edge extension area determining unit, connected to the intersecting object determining unit, for determining the edge extension area of the second object, wherein, the edge extension area of the second object is the area covered by the edge of the second object after it extends outwards for the predetermined distance of T; a first object position information determining unit, connected to the first edge extension area determining unit, the second edge extension area determining unit and the first object moving unit, for determining first information of the first object according to the algorithm by which the edge extension areas of the objects do not intersect one another; wherein, when the first object is in the second position according to the first information, the edge extension area of the first object does not intersect the edge extension area of the second object.

The above-described portable mobile terminal further comprises: a second information determining unit, connected to the intersecting object determining unit, for determining second information of the second object, the second information indicating moving the second object from a third position to a fourth position, the third position being the original position of the second object displayed on the touch screen; a second object moving unit, connected to the second information determining unit, for moving the second object from the third position to the fourth position according to the second information, wherein the distance from the third position to the center is a third distance, the distance from the fourth position to the center is a fourth distance, and the third distance is shorter than the fourth distance.

In the above-described portable mobile terminal, the second information determining unit further comprises: a third edge extension area determining unit, connected to the intersecting object determining unit, for determining the edge extension area of the first object, wherein, the edge extension area of the first object is the area covered by the edge of the first object after it extends outwards for a predetermined distance of T; a fourth edge extension area determining unit, connected to the intersecting object determining unit, for determining the edge extension area of the second object, wherein, the edge extension area of the second object is the area covered by the edge of the second object after it extends outwards for the predetermined distance of T; a second object position information determining unit, connected to the third edge extension area determining unit, the fourth edge extension area determining unit and the second object moving unit, for determining second information of the second object according to the algorithm by which the edge extension areas of the objects do not intersect one another; wherein, when the first object is in the second position according to the first information and the second object is in the fourth position according to the second information, the edge extension area of the first object does not intersect the edge extension area of the second object.

The above-described portable mobile terminal further comprises: a third object judging unit, connected to the predetermined area determining unit, for judging whether there is a third object outside the predetermined area and producing a judgment information; and a fifth edge extension area determination unit, connected to the third object judging unit, for determining the edge extension area of the third object when the third object judging unit judges that there is a third object outside the predetermined area, wherein, the edge extension area of the third object is the area covered by the edge of the third object after it extends outwards for the predetermined distance of T.

In the above-described portable mobile terminal, the first information determining unit connects to the fifth edge extension area determining unit for determining the first information of the first object so that when the first object is in the second position according to the first information, the edge extension area of the first object does not intersect the edge extension area of the second object, at the same time, both the edge extension area of the first object and the edge extension area of the second object do not intersect the edge extension area of the third object.

In the above-described portable mobile terminal, the predetermined area is a circle, the center of which is the touch point and the radius of which is r, wherein, the predetermined distance T is greater than or equal to r.

In the above-described portable mobile terminal, the predetermined area is a square, the center of which is the touch point and the distance from the center to each of the four sides of the square is R, wherein, the predetermined distance T is greater than equal to $\sqrt{2}R$.

The above-described portable mobile terminal further comprises: an available object identifying unit, connected to the intersecting object determining unit, for identifying the first object and the second object as available objects.

According to yet another aspect of the present invention, a display processing method is provided, which is applied in a portable mobile terminal having a touch screen, multiple objects being displayed on the touch screen of the portable mobile terminal. The method comprises: obtaining a touch point, the touch point being a point created when an operating body contacts/approaches the touch screen; when the touch point is the intersection point of at least two objects, determining first information of the movement of the first object, the first information indicating moving the first object from a first position to a second position, the first position being the original position of the first object displayed on the touch screen; moving the first object from the first position to the second position according to the first information, wherein, the distance from the first position to the touch point is a first distance, the distance from the second position to the touch point is a second distance, and the first distance is shorter than the second distance.

According to still another aspect of the present invention, a display processing method is provided, which is applied in a portable mobile terminal having a touch screen, multiple objects being displayed on the touch screen of the portable mobile terminal. The method comprises: obtaining a plurality of touch points, the plurality of touch points being the multiple points created when an operating body contacts/approaches the touch screen; determining a first predetermined area formed by the multiple touch points; determining a first object intersecting the first predetermined area on at least one point and a second object intersecting the first predetermined area on at least one point among multiple objects; determining first information of the movement of the first object, the first information indicating moving the first object from a first position to a second position, the first position being the original position of the first object displayed on the touch screen; and moving the first object from the first position to the second position according to the first information, wherein the distance from the first position to the second position is greater than zero.

FIG. 1 illustrates a prior solution for selecting from concentrated objects on the touch screen. As shown in FIG. 1, according to the solution, the area with concentrated objects on the touch screen is zoomed out and the selection is performed in the zoomed-out area. However, this solution is not suitable for the display and selection of overlapping objects on the touch screen, and overlapping information is still overlapping after zoomed out.

The display processing method and the portable mobile terminal of the present invention can enable the user to easily select the overlapping or adjacent objects on the touch screen. Further, according to the display processing method of the present invention, the overlapping objects on the touch screen are moved to new positions so that the overlapping objects are no longer overlapping or the adjacent objects are moved to new positions so that the adjacent objects are moved far away. The problem of touch faults when the user is selecting can be solved and the problem that the user cannot accurately select the desired object can also be solved.

BRIEF DESCRIPTION OF THE DRAWINGS

FIGS. 2a and 2b are schematic diagrams illustrating an application scene of the display processing method and portable mobile terminal according to an embodiment of the present invention;

FIGS. 3-11 are diagrams of the display processing method according to the first embodiment to the ninth embodiment of the present invention;

DETAILED DESCRIPTION

Figure 1:
FIG. 1 illustrates a prior solution for selecting from concentrated objects on the touch screen.

Hereinafter, the specific embodiment of the display processing method and portable mobile terminal of the embodiment of the present invention is described in detail with reference to the accompanying drawings.

According to one aspect of the embodiment of the present invention, a display processing method is provided, which is applied in a portable mobile terminal. The portable mobile terminal has a touch screen and multiple objects are displayed on the touch screen. The method comprises: obtaining a touch point, the touch point being a point created when an operating body contacts/approaches the touch screen; determining a predetermined area with the touch point being the center; determining a first object intersecting the predetermined area on at least one point and a second object intersecting the predetermined area on at least one point among multiple objects; determining first information of the movement of the first object, the first information indicating moving the first object from a first position to a second position, the first position being the original position of the first object displayed on the touch screen; and moving the first object from the first position to the second position according to the first information, wherein the distance from the first position to the center is a first distance, the distance from the second position to the center is a second distance, and the first distance is shorter than the second distance.

Herein, those skilled in the art can understand that when the operating body contacts/approaches the touch screen, for example, when the user presses the screen with a finger, the user's fingertip can usually form a circular touch area and the portable mobile terminal forms multiple contact points in the touch area according to the circular touch area formed by the user's fingertip. Then, the portable mobile terminal can perform calculation on the multiple contact points according to a certain algorithm so as to form a single touch point on the touch screen. For example, the portable mobile terminal can perform a certain weighted calculation on each touch point according to the density of the multiple touch points, so that the point that is nearest to the center among the multiple touch points is determined to be the finally formed single touch point. In this case, the portable mobile terminal of the embodiment of the present invention can form a predetermined area according to the single touch point finally formed.

In the technical solution of the display processing method of the embodiment of the present invention, the core idea is to judge whether there are multiple overlapping or adjacent objects from the predetermined area formed on the touch screen and perform movement operations on the multiple objects judged above with the touch point as the reference. Therefore, the predetermined area is usually determined by the affected area on the screen when the operating body contacts/approaches the touch screen. For example, the area is generally a circle. And in order to facilitate the movement operation on the multiple objects, the point which is closest to the center among the multiple touch points formed in the touch area is usually used as the reference so that the movement of the overlapping or adjacent multiple objects can be effectively implemented.

According to another aspect of the embodiment of the present invention, a display processing method is provided, which is applied to a portable mobile terminal. The portable mobile terminal has a touch screen, and displays multiple objects on the touch screen of the portable mobile terminal. The method comprises: obtaining a touch point, the touch point being a point created when an operating body contacts/approaches the touch screen; when the touch point is the intersection point of at least two objects, determining first information of the movement of the first object of at least two objects, the first information indicating moving the first object from a first position to a second position, the first position being the original position of the first object displayed on the touch screen; and moving the first object from the first position to the second position according to the first information. The distance from the first position to the center is a first distance, the distance from the second position to the center is a second distance, and the first distance is shorter than the second distance.

Herein, as described above, when the operating body contacts/approaches the touch screen, multiple touch points will be formed in an area on the touch screen and then the portable mobile terminal calculates a single final touch point according to a predetermined algorithm. Different from the above-described embodiment wherein a predetermined area is calculated according to the single touch point finally formed, in the present embodiment, it is directly judged whether the touch point is the intersection point of at least two objects. Additionally, if the touch point is the intersection point of at least two objects, it is indicated that the point formed when the operating body contacts/approaches touch screen is the overlapping part of the at least two objects, and in this case, an operation of moving the object is required. Therefore, in this case, the operation of forming the predetermined area according the touch points in the above embodiment can be omitted, so as to simplify the display processing method according to the embodiment of the present invention.

According to another aspect of the embodiment of the present invention, a display processing method is provided, which is applied to a portable mobile terminal. The portable mobile terminal has a touch screen, and displays multiple objects on the touch screen of the portable mobile terminal. The method comprises: obtaining a plurality of touch points, the plurality of touch points being the multiple points created when an operating body contacts/approaches the touch screen; determining a first predetermined area formed by the multiple touch points; determining a first object intersecting the predetermined area on at least one point and a second object intersecting the predetermined area on at least one point among multiple objects; determining first information of the movement of the first object, the first information indicating moving the first object from a first position to a second position, the first position being the original position of the first object displayed on the touch screen; and moving the first object from the first position to the second position according to the first information. The distance from the first position to the second position is greater than zero.

As mentioned above, when the operating body contacts/approaches the touch screen, multiple touch points will usually be formed on the touch screen. In the above embodiments, in order to facilitate the movement operation of the objects displayed on the touch screen, a single touch point is determined. However, those skilled in the art can understand that it is not necessary herein to determine a single touch point so as to perform the movement of the object. And in this case, the step of the portable mobile terminal's determining a single touch point finally formed from multiple touch points according to a predetermined algorithm can be omitted. Instead, a predetermined area can be formed directly according to the positions of the multiple touch points on the screen and it is judged whether there are at least two objects overlapping the predetermined area among the objects displayed on the screen. And when a first object and a second object are judged to have at least one intersection point each with the predetermined area, the first object is moved so as to facilitate the user's operation. Here, those skilled in the art can understand that, when the first object is moved, the distance from the first position before the movement to the second position after the movement will be greater than zero.

FIGS. 2a and 2b are schematic diagrams illustrating the application scenes of the display processing method according to an embodiment of the present invention. As shown in FIG. 2a and FIG. 2b, when multiple objects are displayed on the touch screen of the portable mobile terminal, the case of two or more overlapping objects might occur, as shown in FIG. 2a and FIG. 2b. And, even if the multiple objects do not overlap each other, the case where two or more objects are close to one another may also occur.

Accordingly, in the embodiment of the present invention, by moving one of the multiple objects in the predetermined area away from the touch point, the distance among the objects can be increased so as to facilitate user's selecting operation on the touch screen to select an object.

In addition, those skilled in the art can understand that the objects in the embodiment of the present invention are not limited to the image objects displayed on the touch screen, they can also be a text displayed on the screen. For example, in the case shown in FIG. 1, when the user touches a paragraph of text displayed on a touch screen, as the characters are very close to one another, so it is difficult for the user to ensure that only one character of the paragraph of text is touched. For example, when a user touches the characters '体育' shown in FIG. 1, in the predetermined area judged by the above embodiments, the two characters '体育' is likely to be included. Thus, in this case, according to the display processing method of the embodiment of the present invention, the two characters '体' and '育' can be separated and according to the technical solution of the embodiment of the present invention, it can be set that if the user touches the character '体', the character '体' is selected; and if the user touches the character '育', the character '育' is selected; and if the blank space between '体' and '育' is touched, various punctuations or other text can be inserted between '体' and '育', for example, the slash symbol can be set to be automatically inserted. Further, in this case, those skilled in the art can understand that, when a movement operation is performed on the text object, the movement operation of the first text object is preferably a movement operation along the direction of the original text alignment direction. For example, as shown in FIG. 1, for the characters '体' and '育', the movement direction is preferably the lateral direction of the screen.

Hereinafter, with reference to FIGS. 3 to 11, the display processing method according to the first embodiment to the ninth embodiment of the present invention will be described.

FIG. 3 is a schematic diagram illustrating the display processing method according to a first embodiment of the present invention. As shown in FIG. 3, according to the first embodiment of the present invention, a display processing method is provided, which is applied to a portable mobile terminal. The portable mobile terminal has a touch screen and displays multiple objects on a touch screen of the portable mobile terminal. The method comprises: obtaining a touch point, the touch point being a point created when an operating body contacts/approaches the touch screen; determining a predetermined area with the touch point being the center; determining a first object S1 intersecting the predetermined area on at least one point and a second object S2 intersecting the predetermined area on at least one point among multiple objects; determining first information of the movement of the first object S1, the first information indicating moving the first object S1 from a first position to a second position, the first position being the original position of the first object S1 displayed on the touch screen; and moving the first object S1 from the first position to the second position according to the first information. The distance from the first position to the center is a first distance d1, the distance from the second position to the center is a second distance d2, and the first distance d1 is shorter than the second distance d2.

In FIG. 3, although the first object before the movement is represented by S1, and the first object after the movement is represented by S1', those skilled in the art may know that S1 and S1' herein both refer to the first object. Further, the movement procedure of the first object on the touch screen can be displayed either in the form of a animation of the first object S1 moving from the first position to the second position, or by directly displaying the first object S1 in the second position from the first position, which is not intended to be limited by the embodiment of the present invention.

Here, the first object S1 is moved from the first distance d1, which is nearer to the center, to the second distance d2, which is farther from the center, so that the first object S1 is moved away from the touch point and the user can conveniently perform operations of selecting the first object S1 and the second object S2.

Figure 4:
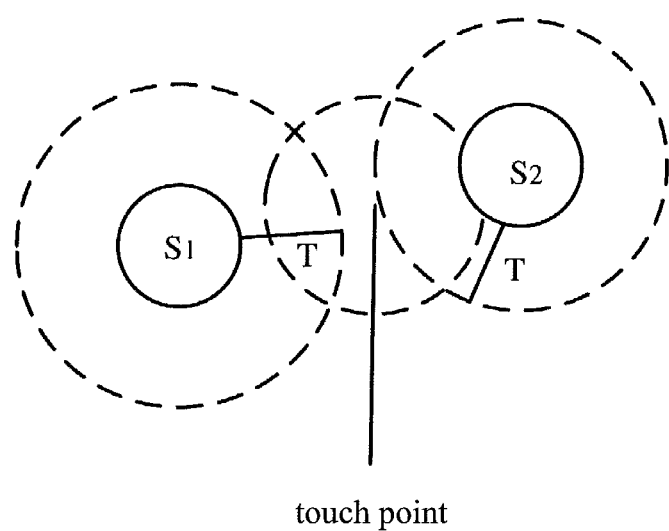

FIG. 4 is a schematic diagram illustrating the display processing method according to the second embodiment of the present invention. As shown in FIG. 4, according to the second embodiment of the present invention, a display processing method is provided, which comprises the steps of the display processing method of the first embodiment and compared with the display processing method of the first embodiment, the step of determining first information of the movement of the first object S1 further comprises: determining an edge extension area of the first object S1, wherein, the edge extension area of the first object S1 is the area covered by the edge of the first object S1 after it extends outwards for a predetermined distance of T; determining an edge extension area of the second object S2, wherein, the edge extension area of the second object S2 is the area covered by the edge of the second object S2 after it extends outwards for the predetermined distance of T; determining first information of the first object S1 according to an algorithm by which the edge extension areas of the objects do not intersect one another; wherein, when the first object S1 is located in the second position according to the first information, the edge extension area of the first object S1 does not intersect the edge extension area of the second object S2.

Compared with the first embodiment, when the first object S1 is moved, in addition to ensuring the distance between the first object S1 and the touch point is increased, it is also ensured that the edge extension area of the first object S1 does not intersect the edge extension area of the second object S2, so that the spacing between the first object S1 and the second object S2 is at least 2T to further facilitate the user to distinguish between the first object S1 and the second object S2 and perform the selecting operation on the touch screen.

Figure 5:
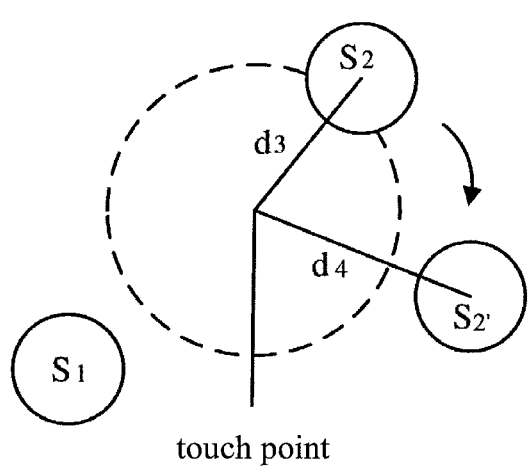

FIG. 5 is a diagram showing a schematic diagram of a display processing method according to the third embodiment of the present invention. As shown in FIG. 5, according to the third embodiment of the present invention, a display processing method is provided, which comprises the steps of the display processing method of the first embodiment and compared with the display processing method of the first embodiment, it further comprises: determining second information of the movement of the second object S2, the second information indicating moving the second object S2 from a third position to a fourth position, the third position being the original position of the second object S2 displayed on the touch screen; and moving the second object S2 from the third position to the fourth position according to the second information, wherein, the distance from the third position to the center is a third distance d3, the distance from the fourth position to the center is a fourth distance d4, and the third distance d3 is shorter than the fourth distance d4.

Compared with the first embodiment, in addition to moving the first object S1 away from the touch point, the second object S2 is further moved so as to facilitate the user to distinguish between the first object S1 and the second object S2 and perform the selecting operation on the touch screen.

Of course, those skilled in the art can understand that moving the second object S2 away from the touch point can be performed at the same time when moving the first object S1 is performed simultaneously or can be performed sequentially, which is not intended to be limited herein by the embodiment of the present invention.

Figure 6:
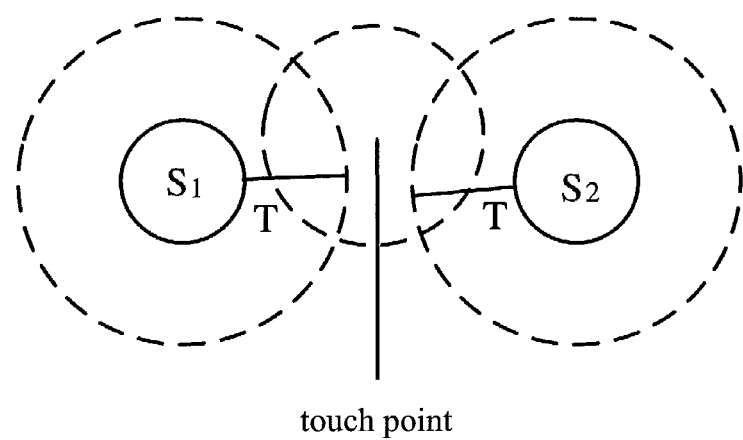

FIG. 6 is a schematic diagram illustrating the display processing method according to the fourth embodiment of the present invention. As shown in FIG. 6, according to the fourth embodiment of the present invention, a display processing method is provided, which comprises the steps of the display processing method of the third embodiment and compared with the display processing method of the third embodiment, the step of determining second information of the movement of the second object S2 further comprises: determining the edge extension area of the first object S1, wherein, the edge extension area of the first object S1 is the area covered by the edge of the first object S1 after it extends outwards for the predetermined distance of T; determining the edge extension area of the second object S2, wherein, the edge extension area of the second object S2 is the area covered by the edge of the second object S2 after it extends outwards for the predetermined distance of T; determining second information of the second object S2 according to the algorithm by which the edge extension areas of the objects do not intersect one another, wherein, when the first object S1 is in the second position according to the first information and the second object is in the fourth position according to the second information, the edge extension area of the first object S1 does not intersect the edge extension area of the second object S2.

Here the principle of the fourth embodiment is similar to that of the second embodiment. Similarly, compared with the third embodiment, when the first object S1 and the second object S2 are moved, in addition to ensuring the distance between the first object S1 and the touch point and the distance between the first object S2 and the touch point are increased, it is also ensured that the edge extension area of the first object S1 does not intersect the edge extension area of the second object S2, so that the spacing between the first object S1 and the second object S2 is at least 2T to further facilitate the user to distinguish between the first object S1 and the second object S2 and perform the selecting operation on the touch screen.

Figure 7:
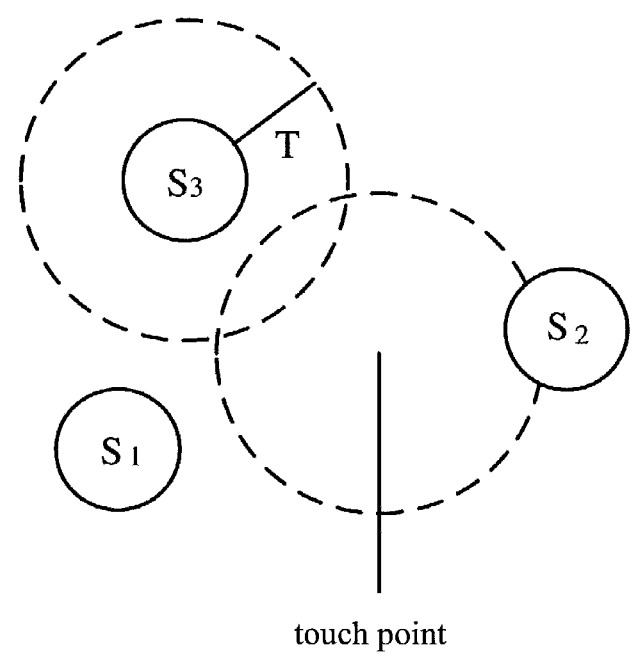

FIG. 7 is a schematic diagram illustrating the display processing method according to the fifth embodiment of the present invention. As shown in the figure, according to the fifth embodiment of the present invention, a display processing method is provided, which comprises the steps of the display processing method of the second embodiment and compared with the display processing method of the second embodiment, before the step of determining the first information of the first object S1 according to the algorithm by which the edge extension areas of the objects do not intersect one another, it further comprises: judging whether there is a third object S3 outside the predetermined area and producing judgment information; when the judgment information indicates that there is a third object S3 outside the predetermined area, determining the edge extension area of the third object S3, wherein the edge extension area of the third object S3 is the area covered by the edge of the third object S3 after it extends outwards for the predetermined distance of T.

Because in the objects displayed on the touch screen of the portable mobile terminal, in addition to the objects that intersect the predetermined area, there may be other objects that do not intersect the predetermined area. Thus, when the first object S1 is moved, the positional relationship of the other objects is also taken into account.

Figure 8:
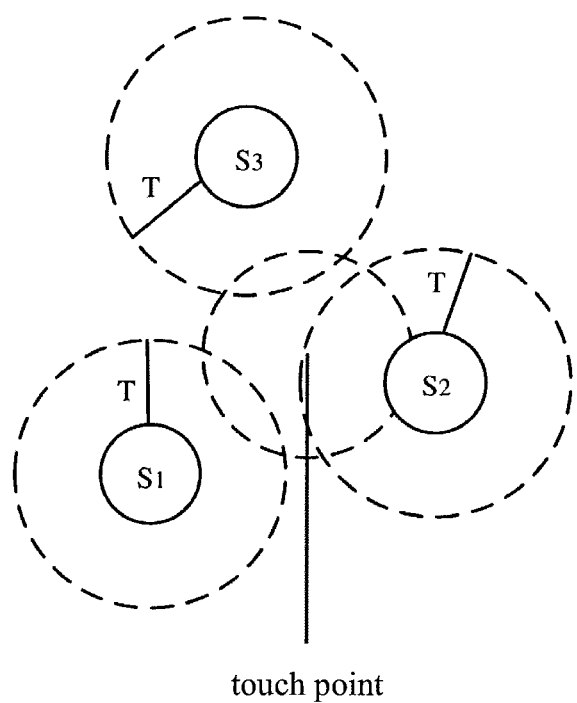

FIG. 8 is a schematic diagram illustrating the display processing method according to the sixth embodiment of the present invention. As shown in FIG. 8, according to the sixth embodiment of the present invention, a display processing method is provided, which comprises the steps of the display processing method of the fifth embodiment and compared with the display processing method of the fifth embodiment, the step of determining the position information of the first object S1 according to the algorithm by which the edge extension areas of the objects do not intersect one another further comprises: when the first the object S1 is in the second position according to the first information, the edge extension area of the first object S1 and the edge extension area of the second object S2 do not overlap, and at the same time the edge extension area of the first object S1 does not overlap the edge extension area of the third object S3.

As described above, the object displayed on the touch screen of the portable mobile terminal, in addition to the objects overlapping the predetermined area, may also include other objects that do not intersect the predetermined area. Thus, when the first object S1 is moved, in addition to ensuring that the edge extension area of the first object S1 and the edge extension area of the second object S2 do not intersect so that the spacing between the first object and the second object is at least 2T, it also should be ensured that the edge extension area of the first object S1 and the edge extension area of the third object S3 do not intersect so that the spacing between the first object S1 and the third object S3 is also at least 2T. Thus, when the user selects multiple objects on the touch screen, in addition to easily selecting a first object S1 and a second object S2 which both intersect the predetermined area, it is also easily to distinguish a first object S1 intersecting the predetermined area and a third object S3 outside the predetermined area so that the user can easily select other objects displayed on screen.

Here, those skilled in the art can understand that although in the embodiment of the present invention, only the first object S1 and the second object S2 within a predetermined area and the third object S3 outside the predetermined area are illustrated, the embodiments of the present invention are not limited thereto. There can be three or more objects within a predetermined area, and simultaneously there can be two or more objects outside the predetermined area. In this case, according to the technical solution of the embodiment of the present invention, the objects will be moved, so that the edge extension area of any two objects do not intersect so as to facilitate the selecting operation of the user.

Figure 9:
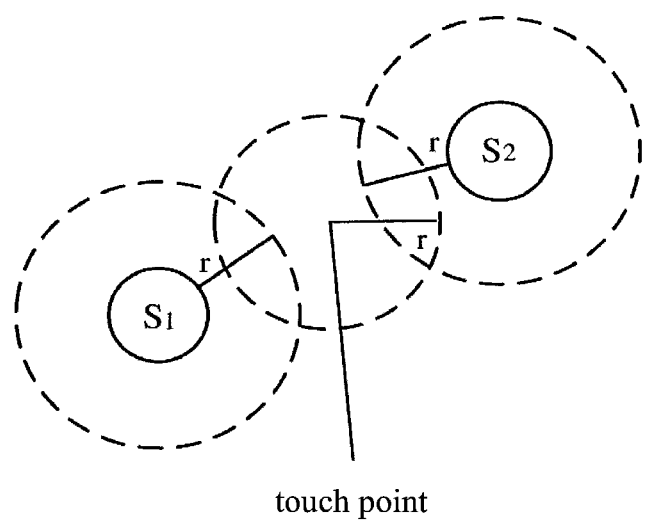

FIG. 9 is a schematic diagram illustrating the display processing method according to the seventh embodiment of the present invention. As shown in FIG. 9, according to the seventh embodiment of the present invention, a display processing method is provided, which comprises the steps of the display processing method of the first embodiment. Herein, in the display processing method of the seventh embodiment, the predetermined area is a circle, the center of which is the touch point and the radius of which is r, wherein, the predetermined distance T is greater than or equal to r.

Here, since the touch area of the user's finger on the touch screen is generally circular, therefore, the predetermined area is set as a circle, and the radius of the circle r is set to the radius of the circular area of the user's fingertip on the touch screen. As described above, the spacing between the first object and the second object on the touch screen is greater than 2T, that is, greater than 2r, so that when the user points the first object S1 and the second object S2 on the touch screen, only one object at the most may be selected, thereby preventing a selecting fault. Further, even though the user selects arbitrarily, no more than one object will be selected, thereby greatly enhancing the user's convenience.

Figure 10:
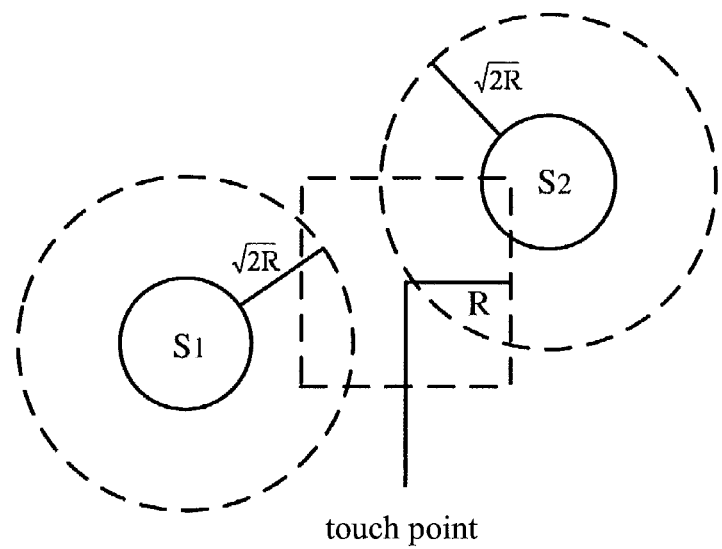

FIG. 10 is a schematic diagram illustrating the display processing method according to the eighth embodiment of the present invention. As shown in FIG. 10, according to the eighth embodiment of the present invention, a display processing method is provided, which comprises the steps of the display processing method of the first embodiment. Herein, in the display processing method of the eighth embodiment, the predetermined area is a square, the center of which is the touch point. The distance from the center to each of the four sides of the square is R, wherein the predetermined distance T is equal to $\sqrt{2}R$.

Here, a predetermined distance of the edge extension area of the edge of the object on the touch screen is set to $\sqrt{2}R$, so as to ensure that when the user selects the first object S1 and the second object S2 on the touch screen, only one object will be selected on the touch screen. Thus a touch fault is prevented and the convenience of the user's selecting operation is enhanced.

Of course, those skilled in the art can understand that the predetermined area determined by the touch point which is the center is not limited to a circle or a square; it can also be of other shapes. Further, in the case where the predetermined area is of other shapes, the predetermined distance of T of the edge extension area of the object on the touch screen is determined correspondingly, and the multiple objects are moved according to the algorithm by which the edge extension areas of the objects do not intersect one another, so that when the user selects the first object and the second object, only one object at the most can be selected on the touch screen.

Figure 11:
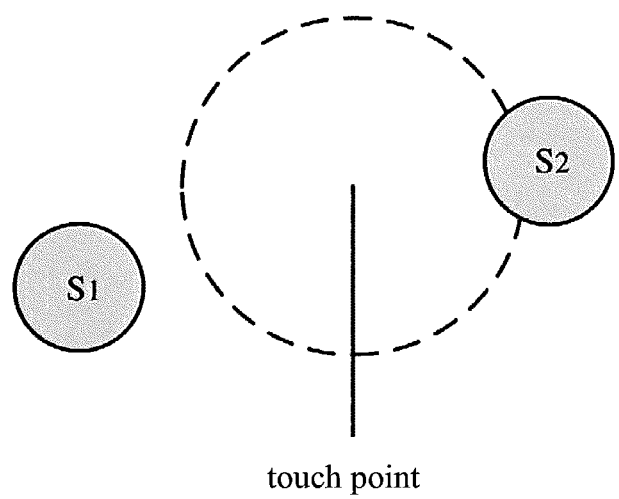

FIG. 11 is a schematic diagram illustrating the display processing method according to the ninth embodiment of the present invention. As shown in FIG. 11, according to the ninth embodiment of the present invention, a display processing method is provided, which comprises the steps of the display processing method of the first embodiment and before the step of determining first information of the movement of the first object S1, it further comprises the following step: identifying the first object S1 and the second object S2 as available objects.

Those skilled in the art can understand that by identifying the first object S1 and the second object S2 as available objects, the objects outside the predetermined area except the first object S1 and the second object S2 are identified as unavailable and thereby inoperable. Thus, it can be ensured that when the user selects the objects displayed on the touch screen, only the first object S1 or the second object S2 as desired by the user can be selected.

Here, the predetermined distance T, r and R can be set based on empirical values, and can correspond to the size of the touch body (such as, a finger).

According to one embodiment of the present invention, a portable mobile terminal is provided. The portable mobile terminal has a touch screen, and multiple objects are displayed on the touch screen of the portable mobile terminal. The portable mobile terminal comprises: a touch point obtaining unit, for obtaining a touch point, the touch point being a point created when an operating body contacts/approaches the touch screen; a predetermined area determining unit, connected to the touch point obtaining unit, for determining a predetermined area with the touch point being the center; an intersecting object determining unit, connected to the predetermined area determining unit, for determining a first object intersecting the predetermined area on at least one point and a second object intersecting the predetermined area on at least one point among multiple objects; a first information determining unit, connected to the intersecting object determining unit, for determining first information of the movement of the first object, the first information indicating moving the first object from a first position to a second position, the first position being the original position of the first object displayed on the touch screen; and a first object moving unit, connected to the first information determining unit, for moving the first object from the first position to the second position according to the first information, wherein the distance from the first position to the center is a first distance, the distance from the second position to the center is a second distance, and the first distance is shorter than the second distance.

As described above, when the operating body contacts/approaches the touch screen, for example, when the user presses the touch screen of the portable mobile terminal with a finger, multiple touch points will be formed on the touch screen. Then, the touch point obtaining unit obtains a final single touch point from the formed multiple touch points, so that it can be used as the reference for object movements. The predetermined area determining unit determines a predetermined area based on the touch point, so as to judge the overlapping or adjacent objects on the screen.

According to another embodiment of the present invention, a portable mobile terminal is provided. The portable mobile terminal has a touch screen, and multiple objects are displayed on the touch screen of the portable mobile terminal. The portable mobile terminal comprises: a touch point obtaining unit, for obtaining a touch point, the touch point being a point created when an operating body contacts/approaches the touch screen; a first information determining unit, for determining first information of the movement of the first object, when the touch point is the intersection point of at least two objects, the first information indicating moving the first object from a first position to a second position, the first position being the original position of the first object displayed on the touch screen; and a first object movement unit, for moving the first object from the first position to the second position according to the first information, wherein the distance from the first position to the center is a first distance, the distance from the second position to the center is a second distance, and the first distance is shorter than the second distance.

In this embodiment, as described above, whether there are overlapping objects among the objects displayed on the touch screen is determined directly according to the touch points, so the predetermined area determining unit is omitted compared with the above embodiments and the overlapping objects are determined only by the single touch point obtained by the touch point obtaining unit, thereby further simplifying the structure of the apparatus.

According to still another embodiment of the present invention, a portable mobile terminal is provided. The portable mobile terminal has a touch screen, and multiple objects are displayed on the touch screen of the portable mobile terminal. The portable mobile terminal comprises: a touch point obtaining unit, for obtaining a plurality of touch points, the plurality of touch points being the plurality of points created when an operating body contacts/approaches the touch screen; a predetermined area determining unit, for determining a first predetermined area formed by the plurality of points; an intersecting object determining unit, for determining a first object intersecting the predetermined area on at least one point and a second object intersecting the predetermined area on at least one point among multiple objects; a first information determining unit, for determining first information of the movement of the first object, the first information indicating moving the first object from a first position to a second position, the first position being the original position of the first object displayed on the touch screen; and a first object moving unit, for moving the first object from the first position to the second position according to the first information, wherein, the distance from the first position to the center is a first distance, the distance from the second position to the center is a second distance, and the first distance is shorter than the second distance.

In this embodiment, as described above, although the portable mobile terminal of the embodiment also comprises a touch point obtaining unit and a predetermined area determining unit, the touch point obtaining unit and the predetermined area determining unit are different from the touch point obtaining unit and the predetermined area determining unit of the portable mobile terminal in the above-described embodiments. The touch point obtaining unit in the portable mobile terminal of the above embodiments creates a final single touch point according to the multiple touch points, and the predetermined area determining unit determines the predetermined area according to the touch point. In the present embodiment, the multiple touch points created when the operating body contacts/approaches the touch screen are determined as touch points and a predetermined area is created from the multiple touch points. Therefore, the above touch point obtaining unit and the predetermined area determining unit are further simplified compared with the touch point obtaining unit and the predetermined area determining unit of the portable mobile terminal in the previous embodiments, thereby making the structure of the device further simplified.

Next, the portable mobile terminal according to the first embodiment to the ninth embodiment of the present invention will be described with reference to FIG. 12 to FIG. 18.

Figure 12:
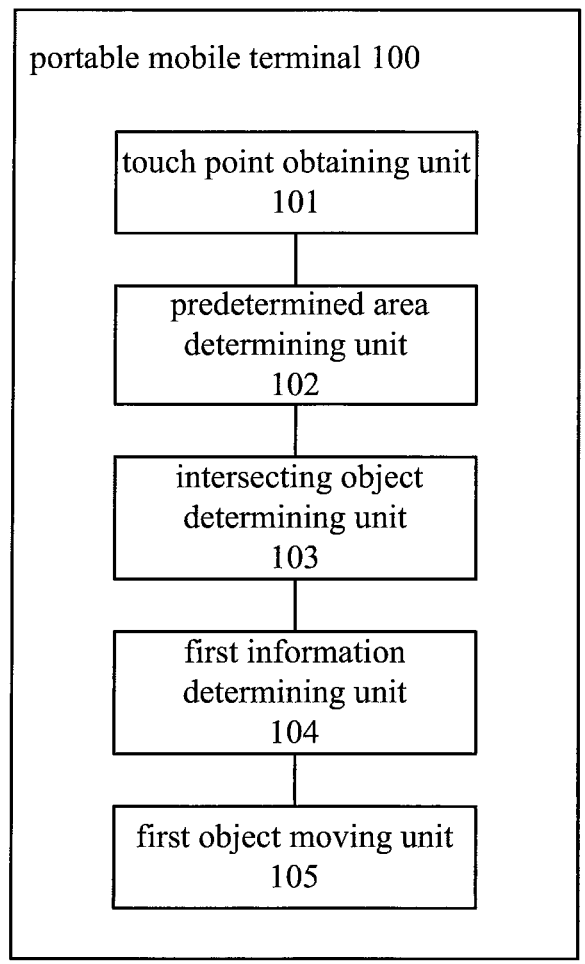
FIGS. 12-18 are diagrams of the portable mobile terminal according to the first embodiment to the ninth embodiment of the present invention.

FIG. 12 is a schematic block diagram showing a portable mobile terminal according to the first embodiment of the present invention. As shown in FIG. 12, according to the first embodiment of the present invention, a portable mobile terminal 100 is provided. The portable mobile terminal 100 has a touch screen (not shown), and multiple objects are displayed on the touch screen of the portable mobile terminal 100. The portable mobile terminal 100 comprises: a touch point obtaining unit 101, for obtaining a touch point, the touch point being a point created when an operating body contacts/approaches the touch screen; a predetermined area determining unit 102, connected to the touch point obtaining unit 101, for determining a predetermined area with the touch point being the center; an intersecting object determining unit 103, connected to the predetermined area determining unit 102, for determining a first object intersecting the predetermined area on at least one point and a second object intersecting the predetermined area on at least one point among multiple objects; a first information determining unit 104, connected to the intersecting object determining unit 103, for determining first information of the movement of the first object, the first information indicating moving the first object from a first position to a second position, the first position being the original position of the first object displayed on the touch screen; and a first object moving unit 105, connected to the first information determining unit 104, for moving the first object from the first position to the second position according to the first information, wherein the distance from the first position to the center is a first distance, the distance from the second position to the center is a second distance, and the first distance is shorter than the second distance.

Figure 13:
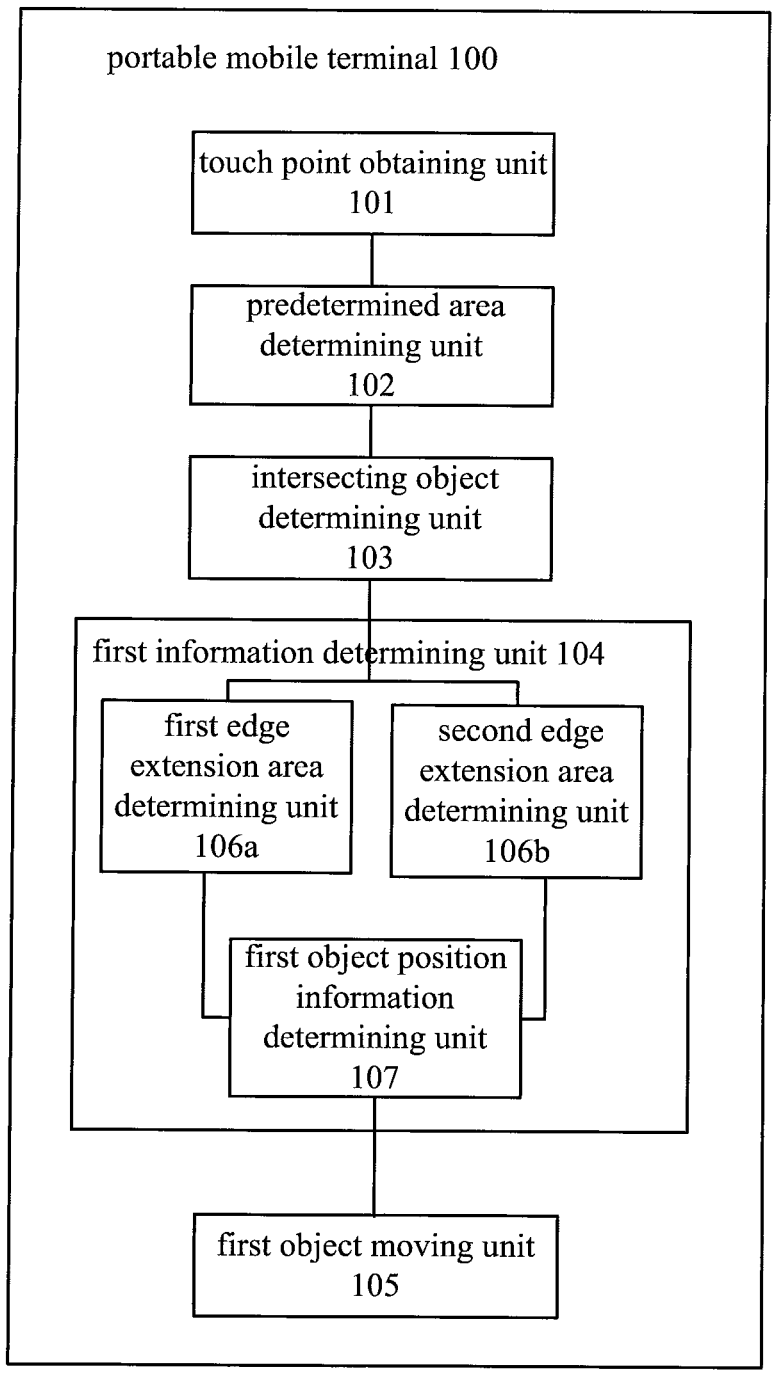

FIG. 13 is a schematic block diagram showing a portable mobile terminal according to a second embodiment of the present invention. As shown in FIG. 13, according to the second embodiment of the present invention, a portable mobile terminal 100 is provided, which comprises all the components of the portable mobile terminal of the first embodiment of the present invention, namely, a touch point obtaining unit 101, a predetermined area determining unit 102, an intersecting object determining unit 103, a first information determining unit 104 and a first object moving unit 105, wherein, the first information determining unit 104 further comprises: a first edge extension area determining unit 106a, connected to the intersecting object determining unit 103, for determining an edge extension area of the first object, wherein, the edge extension area of the first object is the area covered by the edge of the first object after it extends outwards for a predetermined distance of T; a second edge extension area determining unit 106b, connected to the intersecting object determining unit 103, for determining the edge extension area of the second object, wherein, the edge extension area of second first object is the area covered by the edge of the second first object after it extends outwards for the predetermined distance of T; a first object position information determining unit 107, connected to the first edge extension area determining unit 106a, the second edge extension area determining unit 106b and the first object moving unit 105, for determining first information of the first object according to the algorithm by which the edge extension areas of the objects do not intersect one another, wherein, when the first object is in the second position according to the first information, the edge extension area of the first object does not intersect the edge extension area of the second object.

Figure 14:
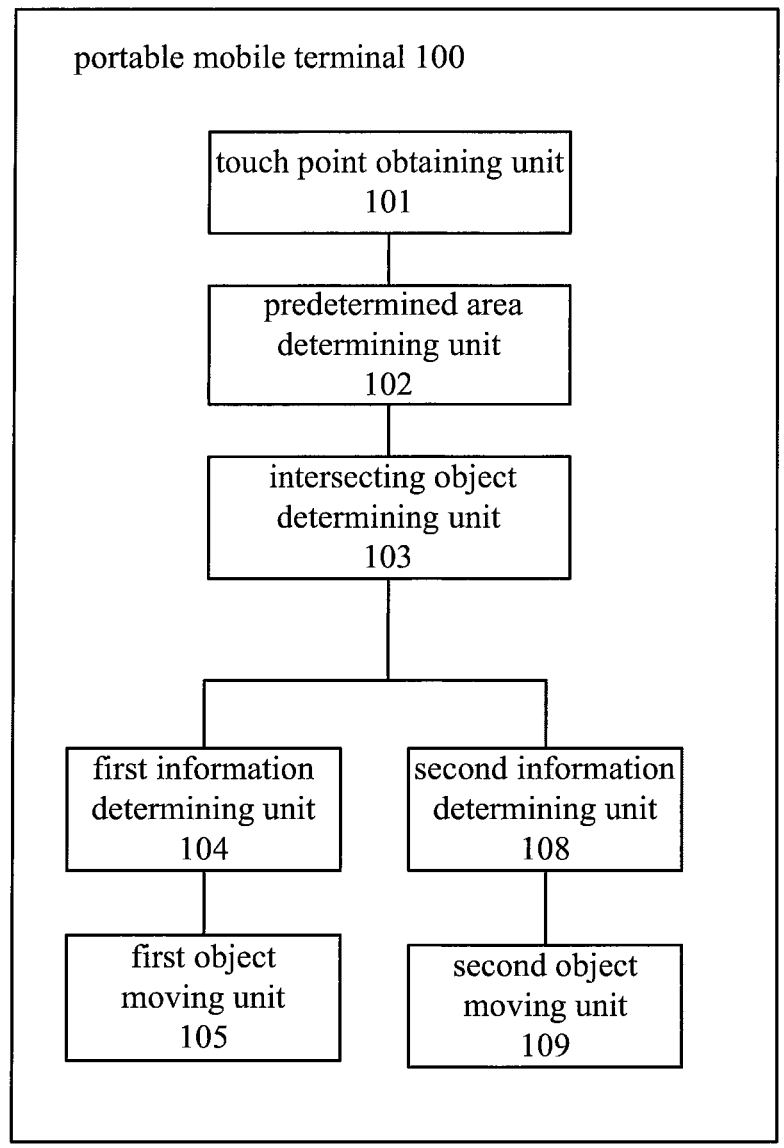

FIG. 14 is a schematic block diagram showing a portable mobile terminal according to a third embodiment of the present invention. As shown in FIG. 14, according to the third embodiment of the present invention, a portable mobile terminal 100 is provided, which comprises all the components of the portable mobile terminal of the first embodiment of the present invention, namely, a touch point obtaining unit 101, a predetermined area determining unit 102, an intersecting object determining unit 103, a first information determining unit 104 and a first object moving unit 105. The portable mobile terminal 100 further comprises: a second information determining unit 108, connected to the overlapping object determining unit 103, for determining second information of the second object, the second information indicating moving the second object from a third position to a fourth position, the third position being the original position of the second object displayed on the touch screen; a second object moving unit 109, connected to the second information determining unit 108, for moving the second object from the third position to the fourth position according to the second information, wherein the distance from the third position to the center is a third distance, the distance from the fourth position to the center is a fourth distance, and the third distance is shorter than the fourth distance.

Figure 15:
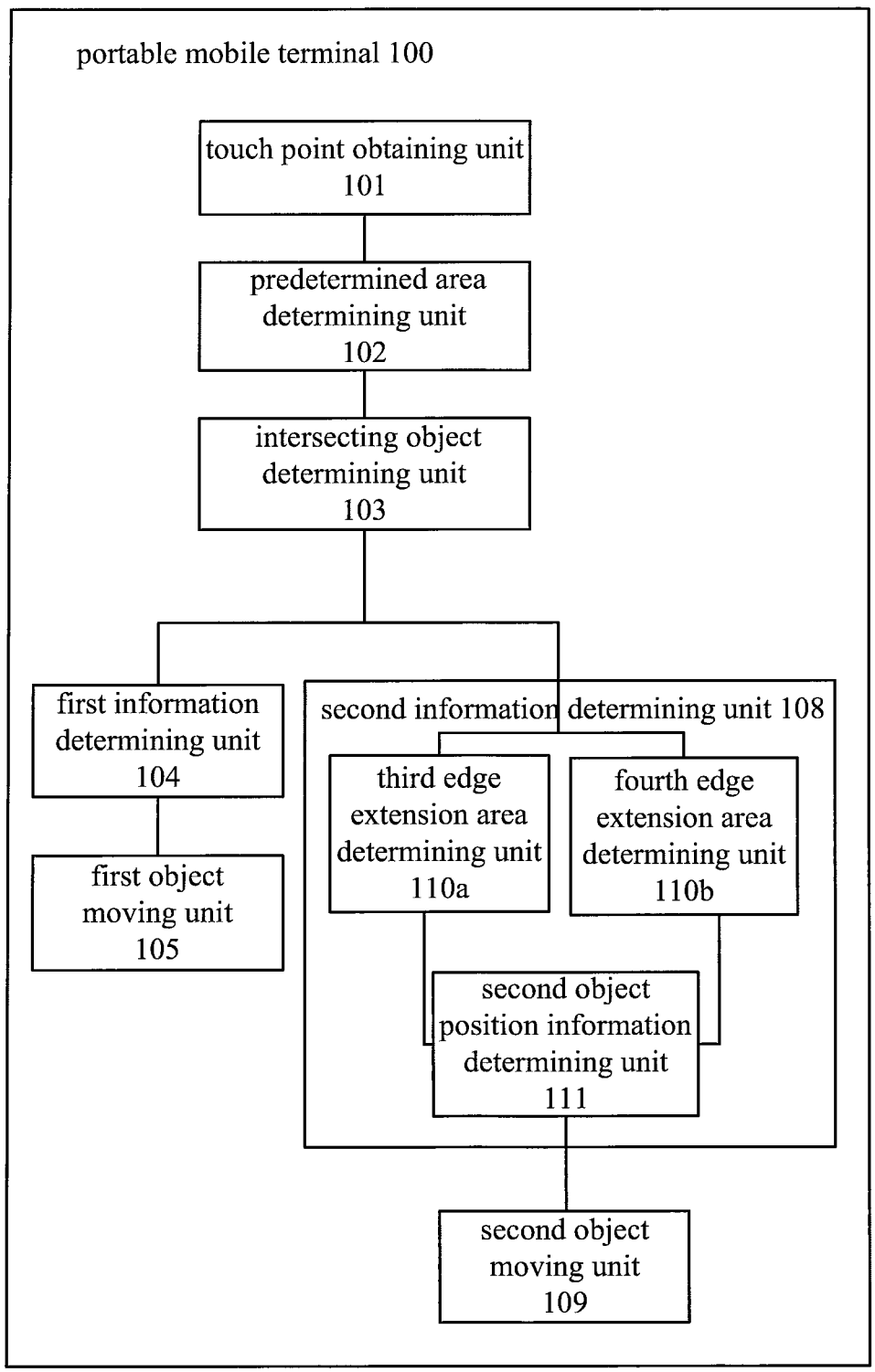

FIG. 15 is a schematic block diagram showing a portable mobile terminal according to a fourth embodiment of the present invention. As shown in FIG. 15, according to the fourth embodiment of the present invention, a portable mobile terminal 100 is provided, which comprises all the components of the portable mobile terminal of the third embodiment of the present invention, namely, a touch point obtaining unit 101, a predetermined area determining unit 102, an intersecting object determining unit 103, a first information determining unit 104, a first object moving unit 105, a second information determining unit 108 and a second object moving unit 109. The second information determining unit 108 further comprises: a third edge extension area determining unit 110a, connected to the intersecting object determining unit 103, for determining the edge extension area of the first object, wherein, the edge extension area of the first object is the area covered by the edge of the first object after it extends outwards for the predetermined distance of T; a fourth edge extension area determining unit 110b, connected to the intersecting object determining unit 103, for determining the edge extension area of the second object, wherein, the edge extension area of the second object is the area covered by the edge of the second object after it extends outwards for the predetermined distance of T; a second object position information determining unit 111, connected to the third edge extension area determining unit 110a, the fourth edge extension area determining unit 110b and the second object moving unit 109, for determining second information of the second object according to the algorithm by which the edge extension areas of the objects do not intersect one another, wherein, when the first object is in the second position according to the first information and the second object is in the fourth position according to the second information, the edge extension area of the first object does not intersect the edge extension area of the second object.

Herein, although the portable mobile terminals according to the second embodiment and the fourth embodiment of the present invention are described, wherein, the first information determining unit 104 comprises the first edge extension area determining unit 106a and the second edge extension area determining unit 106b and the second information determining unit 108 comprises the third edge extension area determining unit 110a and the fourth edge extension area determining unit 110b, those skilled in the art can understand that the first information determining unit 104 and the second information determining unit 108 can share the first object edge extension area determining unit and/or the second object edge extension area determining unit for determining the edge extension area of the first object and the second object respectively.

Figure 16:
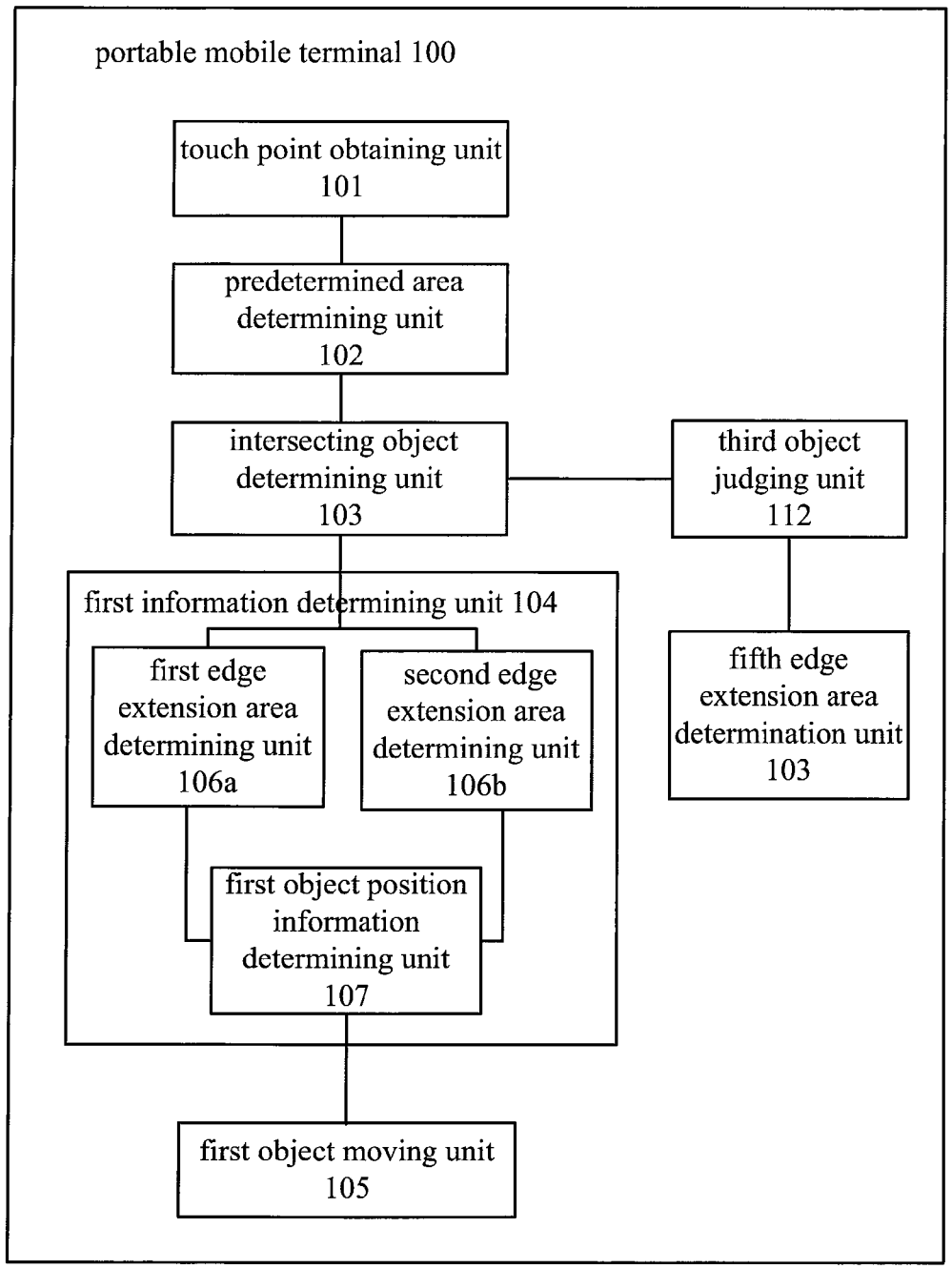

FIG. 16 is a schematic block diagram showing a portable mobile terminal according to a fifth embodiment of the present invention. As shown in FIG. 16, according to the fifth embodiment of the present invention, a portable mobile terminal 100 is provided, which comprises all the components of the portable mobile terminal of the second embodiment of the present invention, namely, a touch point obtaining unit 101, a predetermined area determining unit 102, an intersecting object determining unit 103, a first information determining unit 104 and a first object moving unit 105. And the first information determining unit 104 comprises the first edge extension area determining unit 106a and the second edge extension area determining unit 106b and the first object position information determining unit 107. The portable mobile terminal 100 further comprises: a third object judging unit 112, connected to the predetermined area determining unit 102, for judging whether there is a third object outside the predetermined area and producing judgment information; a fifth edge extension area determination unit 113, connected to the third object judging unit 112, for determining the edge extension area of the third object when the third object judging unit 112 judges that there is a third object outside the predetermined area, wherein, the edge extension area of the third object is the area covered by the edge of the third object after it extends outwards for a predetermined distance of T.

Figure 17:
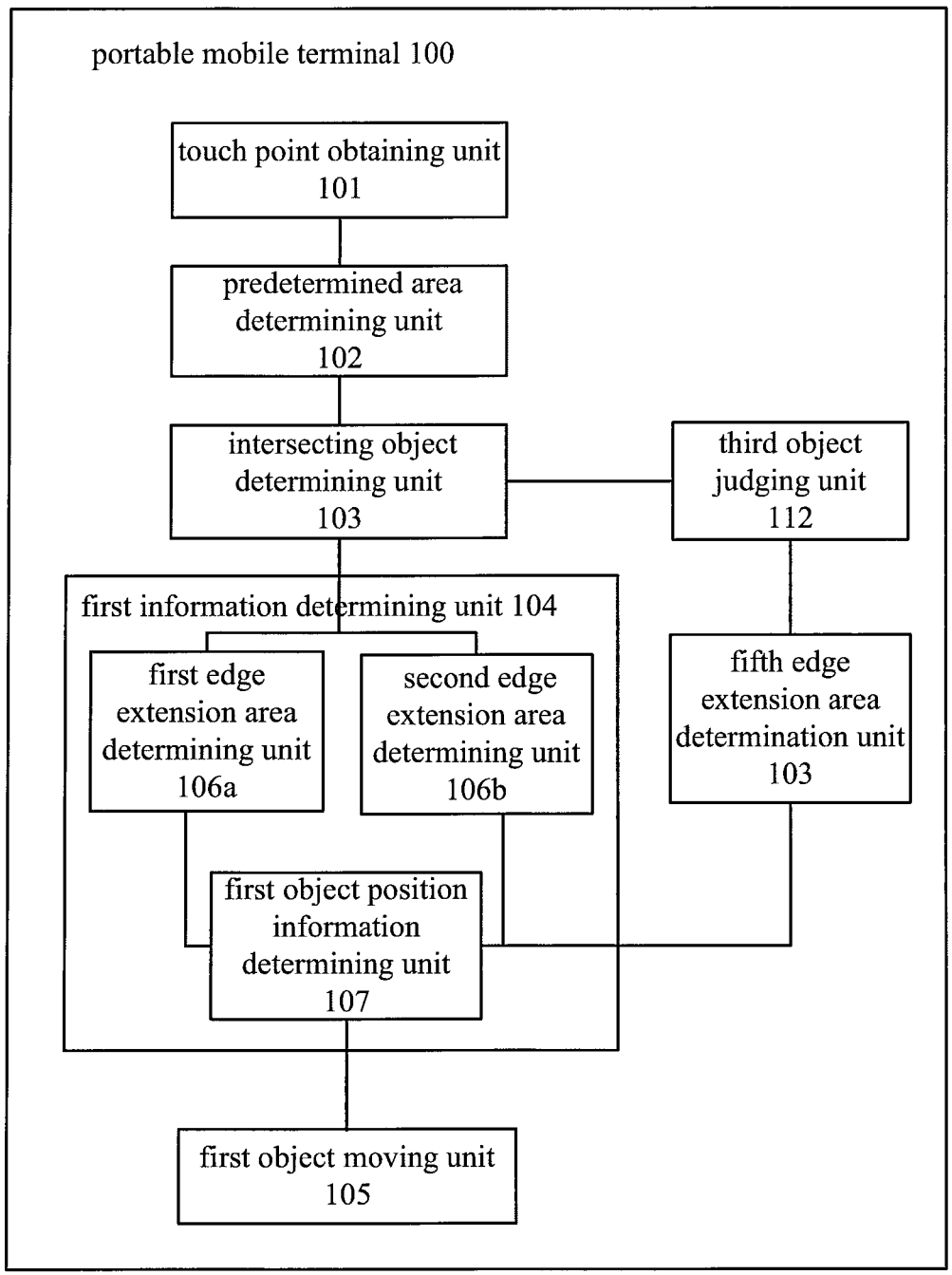

FIG. 17 is a schematic block diagram showing a portable mobile terminal according to a sixth embodiment of the present invention. As shown in FIG. 17, according to the sixth embodiment of the present invention, a portable mobile terminal 100 is provided, which comprises all the components of the portable mobile terminal of the fifth embodiment of the present invention, namely, a touch point obtaining unit 101, a predetermined area determining unit 102, an intersecting object determining unit 103, a first information determining unit 104 and a first object moving unit 105, a third object determining unit 112 and a fifth edge extension area determining unit 113. And the first information determining unit 104 comprises the first edge extension area determining unit 106a and the second edge extension area determining unit 106b and the first object position information determining unit 107. Wherein, the first information determining unit 104 further connects to the fifth edge extension area determining unit 113 for determining the first information of the first object so that when the first object is in the second position according to the first information, the edge extension area of the first object does not intersect the edge extension area of the second object, and the edge extension area of the first object does not intersect the edge extension area of the third object.

The portable mobile terminal 100 according to the seventh embodiment of the present invention, the component configuration of which is substantially the same with the portable mobile terminal 100 according to the first embodiment of the present invention shown in FIG. 12, comprises a touch point obtaining unit 101, a predetermined area determining unit 102, an intersecting object determining unit 103, a first information determining unit 104 and a first object moving unit 105. Here, in the portable mobile terminal 100 according to the seventh embodiment of the present invention, the predetermined area is a circle, the center of which is the touch point and the radius of which is r, wherein, the predetermined distance T is greater than or equal to r.

The portable mobile terminal 100 according to the eighth embodiment of the present invention, the component configuration of which is substantially the same with the portable mobile terminal 100 according to the first embodiment of the present invention shown in FIG. 12, comprises a touch point obtaining unit 101, a predetermined area determining unit 102, an intersecting object determining unit 103, a first information determining unit 104 and a first object moving unit 105. Here, in the portable mobile terminal 100 according to the eighth embodiment of the present invention, the predetermined area is a square, the center of which is the touch point. The distance from the center to each of the four sides of the square is R, wherein, the predetermined distance T is equal to $\sqrt{2}R$.

Figure 18:
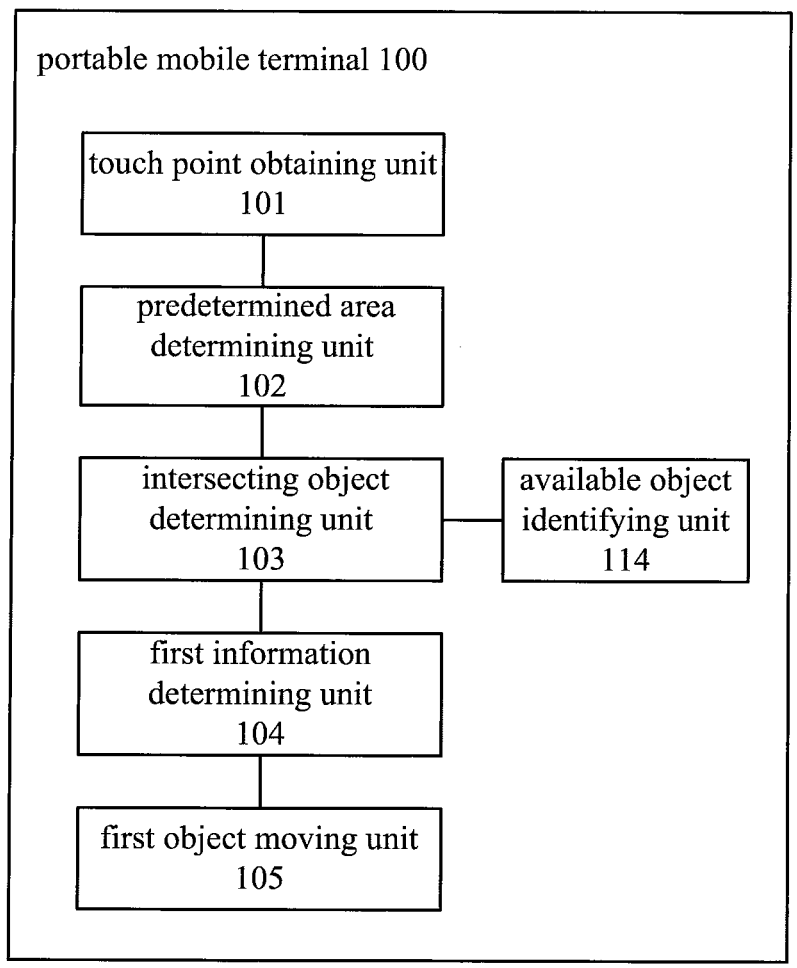

FIG. 18 is a schematic block diagram showing a portable mobile terminal according to a ninth embodiment of the present invention. As shown in FIG. 18, according to the ninth embodiment of the present invention, a portable mobile terminal 100 is provided, which comprises all the components of the portable mobile terminal of the first embodiment of the present invention, namely, a touch point obtaining unit 101, a predetermined area determining unit 102, an intersecting object determining unit 103, a first information determining unit 104 and a first object moving unit 105. The portable mobile terminal 100 further comprises: an available object identifying unit 114, connected to the intersecting object determining unit 103, for identifying the first object and the second object as available objects.

Here, the predetermined distance T, r and R can be set based on empirical values, and can correspond to the size of the touch body (such as, a finger).

Figure 19:
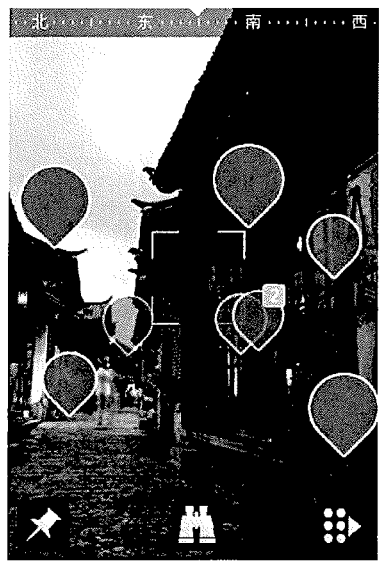
FIGS. 19-21 are diagrams showing specific examples of the display processing method and the portable mobile terminal according to embodiments of the present invention.
Figure 20:
Figure 21:
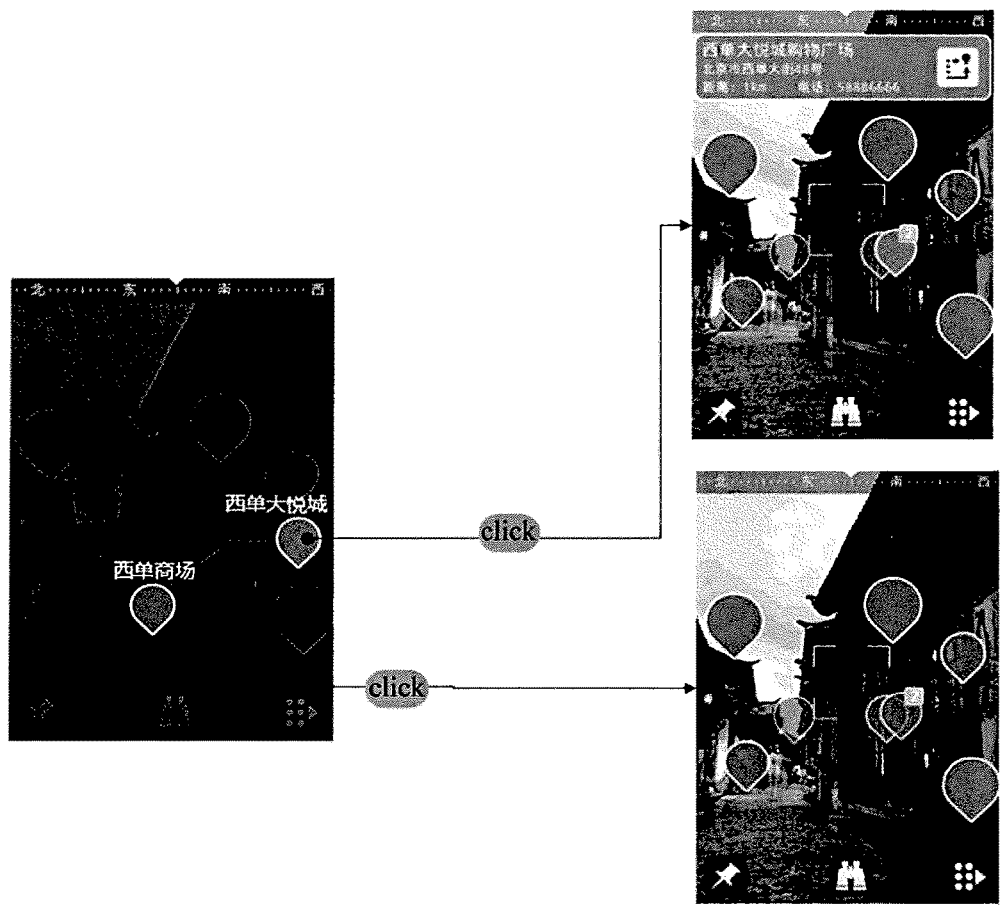

Hereinafter, specific examples of the display processing method according to embodiments of the present invention are described with reference to FIGS. 19-21. FIGS. 19-21 are diagrams showing specific examples of the display processing method according to embodiments of the present invention.

As shown in FIG. 19, the objects are displayed on the screen in accordance with the actual positions and when there are two objects whose overlapping area is larger than a half of their area (or they block each other more than the radius), the number of the overlapping points is additionally displayed. For example, in FIG. 19, there are two overlapping objects, so the icon "2" is added to display the number in order to facilitate the user's identification.

As shown in FIG. 20, when the user performs the selecting operation, the user uses his finger to select on the screen. When there are multiple objects in the trigger area (the area blocked by the finger is the trigger area when the finger is clicking), the objects are scattered. And during the scattering, the number marked disappears and the color of the screen turns darker. It usually turns black, that is, the screen will be pressed to be black and the other elements on the screen will be locked. The scattered objects automatically select the best arrangement. For example, in FIG. 20, when a specific location on the screen is selected by the user, the objects identified as 西单大悦城 (Xidan Joy City) and "西单商场" (Xidan shopping mall) scatter.

As shown in FIG. 21, when the user clicks a scattered object, the object is selected, the color dark effect of the screen, i.e. the pressed black of the screen, disappears, and each object returns to its original position. And when the user clicks the dark area but does not touch the object, the color dark effect disappears, and each object returns to its original position with no point being selected.

The display processing method and the portable mobile terminal according to the embodiments of the present invention can enable the user to easily select the objects on the touch screen by moving the overlapping objects on the touch screen to make them not overlapping or moving the adjacent objects far away from each other, so as to facilitate the user's operations. Further, since the overlapping objects on the touch screen are moved to new positions, so as to ensure that the area covered by the user's finger only intersects one object so as to ensure that the user can select the desired object, thereby solving the problem of touch faults when the user is selecting.

The present invention has been described in detail with reference to the specific embodiments. However, it is apparent that changes and substitutions can be made by those skilled in the art without departing from the spirit of the invention. In other words, the present invention is disclosed in the form of description, rather than explained with limitations. To determine the gist of the invention, the appended claims should be considered.

What is claimed is:

1. A display processing method, applied in a portable mobile terminal having a touch screen, multiple subjects being displayed on the touch screen of the portable mobile terminal, the method comprising:
    obtaining a touch point, the touch point being a point created when an operating body contacts the touch screen for object selection;
    determining a predetermined area with the touch point being the center;
    determining a first object intersecting the predetermined area on at least one point and a second object intersecting the predetermined area on at least one point among multiple objects;
    determining first information of the movement of the first object, the first information indicating moving the first object from a first position to a second position, the first position being the original position of the first object displayed on the touch screen; and
    based on the determining first information of the movement of the first object, automatically moving the first object from the first position to the second position according to the first information, wherein, the distance from the first position to the center is a first distance, the distance from the second position to the center is a second distance, and the first distance is shorter than the second distance so that only one of the first object and the second object is to be selected on the touch screen,
    wherein before a step of determining first information of the movement of the first object, identifying the first object and the second object as available objects, and identifying objects outside the predetermined area except the first object and the second object as unavailable and thereby inoperable.

2. The display processing method according to claim 1, wherein the step of determining first information of the movement of the first object comprises:
    determining an edge extension area of the first object, wherein, the edge extension area of the first object is the area covered by the edge of the first object after it extends outwards for a predetermined distance of T;
    determining an edge extension area of the second object, wherein, the edge extension area of the second object is the area covered by the edge of the second object after it extends outwards for the predetermined distance of T;
    determining the first information of the first object according to an algorithm by which the edge extension areas of the objects do not intersect one another;
    wherein, when the first object is in the second position according to the first information, the edge extension area of the first object does not intersect the edge extension area of the second object.

3. The display processing method according to claim 2, wherein, before the step of determining the first information of the first object according to the algorithm by which the edge extension areas of the objects do not intersect one another, further comprising:
    judging whether there is a third object outside the predetermined area and producing judgment information; and
    when the judgment information indicates that there is a third object outside the predetermined area, determining an edge extension area of the third object, wherein, the edge extension area of the third object is the area covered by the edge of the third object after it extends outwards for the predetermined distance of T.

4. The display processing method according to claim 3, wherein, the step of determining the first information of the first object according to the algorithm by which the edge extension areas of the objects do not intersect one another further comprises:
    when the first object is in the second position according to the first information, the edge extension area of the first object does not intersect the edge extension area of the second object, and at the same time, the edge extension area of the first object does not intersect the edge extension area of the third object.

5. The display processing method according to claim 2, wherein, the predetermined area is a circle, the center of which is the touch point and the radius of which is r, wherein, the predetermined distance T is greater than or equal to r.

6. The display processing method according to claim 2, wherein the predetermined area is a square, the center of which is the touch point and the distance from the center to each of the four sides of the square is R, wherein, the predetermined distance T is greater than or equal to $\sqrt{2}R$.

7. The display processing method according to claim 1, further comprising:
    determining second information of the movement of the second object, the second information indicating moving the second object from a third position to a fourth position, the third position being the original position of the second object displayed on the touch screen; and
    moving the second object from the third position to the fourth position according to the second information, wherein, the distance from the third position to the center is a third distance, the distance from the fourth position to the center is a fourth distance, and the third distance is shorter than the fourth distance.

8. The display processing method according to claim 7, wherein, the step of determining the second information of the movement of the second object further comprises:
    determining an edge extension area of the first object, wherein, the edge extension area of the first object is the area covered by the edge of the first object after it extends outwards for a predetermined distance of T;

determining an edge extension area of the second object, wherein, the edge extension area of the second object is the area covered by the edge of the second object after it extends outwards for the predetermined distance of T;

determining second information of the second object according to an algorithm by which the edge extension areas of the objects do not intersect one another, wherein, when the first object is in the second position according to the first information and the second object is in the fourth position according to the second information, the edge extension area of the first object does not intersect the edge extension area of the second object.

9. A display processing method, applied in a portable mobile terminal having a touch screen, multiple subjects being displayed on the touch screen of the portable mobile terminal, the method comprising:

obtaining a touch point, the touch point being a point created when an operating body contacts the touch screen for object selection;

when the touch point is the intersection point of at least two objects, determining first information of the movement of the first object, the first information indicating moving the first object from a first position to a second position, the first position being the original position of the first object displayed on the touch screen; and based on the determining first information of the movement of the first object, automatically moving the first object from the first position to the second position according to the first information, wherein, the distance from the first position to the touch point is a first distance, the distance from the second position to the touch point is a second distance, and the first distance is shorter than the second distance so that only one of the first object and the second object is to selected on the touch screen, wherein before a step of determining first information of the movement of the first object, identifying the first object and the second object as available objects, and identifying objects outside the predetermined area except the first object and the second object as unavailable and thereby inoperable.

10. A display processing method, applied in a portable mobile terminal having a touch screen, multiple subjects being displayed on the touch screen of the portable mobile terminal, the method comprising:

obtaining a plurality of touch points, the plurality of touch points being the multiple points created when an operating body contacts the touch screen for object selection;

determining a first predetermined area formed by the multiple touch points;

determining a first object intersecting the predetermined area on at least one point and a second object intersecting the predetermined area on at least one point among multiple objects;

determining first information of the movement of the first object, the first information indicating moving the first object from a first position to a second position, the first position being the original position of the first object displayed on the touch screen; and based on the determining first information of the movement of the first object, automatically moving the first object from the first position to the second position according to the first information, wherein the distance from the first position to the second position is greater than zero so that only one of the first object and the second object is to be selected on the touch screen, wherein before a step of determining first information of the movement of the first object, identifying the first object and the second object as available objects, and identifying objects outside the predetermined area except the first object and the second object as unavailable and thereby inoperable.

* * * * *